(12) United States Patent
Krotki

(10) Patent No.: US 7,269,570 B2
(45) Date of Patent: Sep. 11, 2007

(54) SURVEY ASSIGNMENT METHOD

(75) Inventor: Karol P. Krotki, Palo Alto, CA (US)

(73) Assignee: Knowledge Networks, Inc., Menlo Park, CA (US)

( * ) Notice: Subject to any disclaimer, the term of this patent is extended or adjusted under 35 U.S.C. 154(b) by 883 days.

(21) Appl. No.: 09/740,515

(22) Filed: Dec. 18, 2000

(65) Prior Publication Data

US 2002/0077881 A1    Jun. 20, 2002

(51) Int. Cl.
 *G06F 17/30*    (2006.01)
(52) U.S. Cl. ........................................................ 705/10
(58) Field of Classification Search ...................... 705/1, 705/10
 See application file for complete search history.

(56) References Cited

U.S. PATENT DOCUMENTS

| | | | | |
|---|---|---|---|---|
| 6,070,145 | A * | 5/2000 | Pinsley et al. | 705/10 |
| 6,098,048 | A * | 8/2000 | Dashefsky et al. | 705/10 |
| 6,532,458 | B1 * | 3/2003 | Chaudhuri et al. | 707/2 |
| 6,542,886 | B1 * | 4/2003 | Chaudhuri et al. | 707/2 |
| 6,754,635 | B1 * | 6/2004 | Hamlin et al. | 705/10 |
| 6,778,807 | B1 * | 8/2004 | Martino et al. | 434/362 |
| 7,054,828 | B2 * | 5/2006 | Heching et al. | 705/10 |
| 2002/0016731 | A1* | 2/2002 | Kupersmit | 705/10 |
| 2002/0128898 | A1* | 9/2002 | Smith et al. | 705/10 |
| 2003/0088458 | A1* | 5/2003 | Afeyan et al. | 705/10 |
| 2004/0133463 | A1* | 7/2004 | Benderev | 705/10 |

OTHER PUBLICATIONS

Schafer, Sarah, "To Politically Connect, and Profitably Collect", Washington Post, Dec. 13, 1999 [retrieved Mar. 4, 2005], pp. 1-6, retrieved from: archive.org, www.knowledgenetworks.com.*
Rivlin, Allan, "Web Surveys, The Sequel", National Journal, Oct. 20, 1999 [retrieved Mar. 4, 2005], pp. 1-4, retrieved from: archive. org, www.knowledgenetworks.com.*
"InterSurvey is Providing Polls on 2000 Election", www. knowledgenetworks.com, Dec. 14, 1999 [retrieved Mar. 4, 2005], pp. 1-4, retrieved from: archive.org.*
Decision Analyst, Inc., www.decisionanalyst.com, Jun. 22, 2000 [retrieved Mar. 4, 2005], pp. 1-15, retrieved from: Google.com and archive.org.*
"A Brief Introduction to Sampling", pyschology.ucdavis.edu/rainbow/html/Fact_sample.html, Feb. 20, 1999 [retrieved Mar. 4, 2005], pp. 1-7, retrieved from: Google.com and archive.org.*
"Sampling with replacement and sampling without replacement", www.ma.utexas.edu, Nov. 1, 1998, [retrieved Mar. 4, 2005], 1 page, retrieved from: Google.com.*

(Continued)

*Primary Examiner*—B. Van Doren
(74) *Attorney, Agent, or Firm*—Buchanan, Ingersoll & Rooney LLP

(57) ABSTRACT

A survey assignment method uses a weighting factor to compensate for members which are temporarily removed from a panel. This weighting factor allows for non-proportionate samples to be made from the panel. Additionally, a non-proportionate selection weighting factor can also be used. By using these weighting factors, a relatively random selection of the members for survey can be done.

7 Claims, 5 Drawing Sheets

OTHER PUBLICATIONS

Yaffee, Robert A., "SUDAAN 7: Statistical Analysis Software from Complex Sample Designs", www.nyu.edu/its/pubs/connect/archives/97summer/yaffeesudaan.html, Apr. 28, 1997 [retrived Nov. 18, 2005], pp. 1-3, retrived from: Google.com.*

Fiorelli, Joseph S., "The Organization Health Report", Human Resource Planning, 1998 [retrieved Nov. 18, 2005], vol. 21, No. 2, pp. 1-8, retrieved from: Dialog, file 15.*

Snee, Ronald D, "Listening to the Voice of the Employee", Quality Progress, Jan. 1995 [retrieved Nov. 18, 2005], vol. 28, No. 1, pp. 1-8, retrieved from: Dialog, file 15.*

"Probability Definitations", stat.wvu.edu/SRS/Modules/ProbDef/urn.html, Dec. 9, 2000 [retrieved Nov. 18, 2005], pp. 1-2, retrieved from Google.com and archive.org.*

White, Paul, www.cems.uwe.ac.uk/~pwhite, Sep. 2, 1998 [retrieved Dec. 6, 2006]pp. 1-4, retrieved from: Google.com.*

"Survey Sampling Methods", www.statpac.com/surveys/sampling.htm, Oct. 3, 2000 [retrieved Dec. 6, 2006], pp. 1-2, retrieved from: archive.org.*

Christopher, Heidi, "Environmental Sampling and Monitoring Primer", ewr.cee.vt.edu, Sep. 10, 1997 [retrieved Oct. 6, 2006], pp. 1-5, retrieved from: Google.com.*

Morin, Richard, "Lights out for traditional Polls", Washington Post, May 15, 2000 [retrieved May 15, 2007], pp. 1-3, retrieved from: google.com and archive.org.*

* cited by examiner

| PANEL MEMBER | AFFILIATION | 50 {MOS | Cumulative MOS | Selected} | 52 {MOS | Cumulative MOS | Selected} |
|---|---|---|---|---|---|---|---|
| 1 | D | 1 | 1 | | 1.25 | 1.25 | ✓ |
| 2 | R | 0 | 1 | | 1 | 2.25 | |
| 3 | R | 0 | 1 | | 1 | 3.25 | |
| 4 | D | 1 | 2 | | 1.25 | 4.50 | |
| 5 | D | 1 | 3 | ✓ | 0 | 4.50 | |
| 6 | R | 0 | 3 | | 1 | 5.50 | ✓ |
| 7 | D | 1 | 4 | | 1.25 | 6.75 | |
| 8 | D | 1 | 5 | | 1.25 | 8.00 | |
| 9 | R | 0 | 5 | | 1 | 9.0 | ✓ |
| 10 | R | 0 | 5 | | 1 | 10.0 | |

$$\text{INTERVAL } K' = \frac{\Sigma(mos)}{n} = \frac{1000}{200} = 5$$

$$RN = (0, K') \quad 3$$

FIRST SELECTION  Cumulative = 3 mos
SECOND SELECTION  Cumulative = 8 mos $$\text{INTERVAL} = K' = \frac{2000}{500} = 4$$

$$RN = (0, K') \quad 1$$

FIRST SELECTION  Cumulative = 1 mos
SECOND SELECTION  Cumulative = 5 mos
THIRD SELECTION  Cumulative = 9 mos

FIGURE 3

| | Panel Number | MOS | Cumulative MOS | Selected |
|---|---|---|---|---|
| Household { | 1 | 1 | 1. | ✓ |
| | 2 | 1.25 | 2.25 | |
| | 3 | 0 | 2.25 | |
| Household { | 4 | 1.25 | 3.50 | |
| | 5 | 1.25 | 4.75 | |
| | 6 | 1 | 5.75 | |
| | 7 | 1 | 6.75 | |
| Household { | 8 | 1 | 7.75 | ✓ |
| | 9 | 1.25 | 9.00 | |
| household { | 10 | 1 | 10.00 | |

Household Strata #1

Household Strata #2

Interval $K' = 5$
$RN = 2$

First Selection Cumulative MOS = 2

Second Selection Cumulative MOS = 9

Figure 4

|  | $W_o$ | $W_A$ | $W_S$ | TOTAL |
|---|---|---|---|---|
| DEM | 1.0 | 1.25 | 0.8 | 1.0 |
| REP | 1.0 | 1.0 | 1.2 | 1.2 |

SURVEY ASSIGNMENT METHOD

BACKGROUND OF THE PRESENT INVENTION

The present invention concerns selection methods for surveys. In many selection methods, people are selected from a existing panel for surveys. Often only panel members with certain characteristics are selected for a survey. This can skew the remaining panel and affect later surveys.

It is desired to have an improved system for selecting surveys from a panel.

SUMMARY OF THE PRESENT INVENTION

In some cases, it's desirable that survey members be selected from a panel only once in a predetermined time period. For example, users for some panels can be surveyed only once a week. If members are selected for a previous survey because of certain characteristics, this can tend to skew the characteristics of the remainder of the panel.

For example, if the panel originally consists of 2,000 members—1,000 Democrats and 1,000 Republicans—and 200 Democrats are removed from the panel, the remaining panel is skewed toward Republicans. The method of the present invention weights the selection probabilities for the remaining members of the panel to compensate for the removal of the first set of members from the available survey panel. One way of doing this is to increase the selection probabilities of the remaining members of the group. In the example above, if the remaining Democrats are given a weight 1.25 (1000/800) while the Republicans have a weight of 1, random sampling of the remaining members with probabilities proportionate to these weights will tend to produce somewhat equal numbers of Republicans and Democrats like the original composition of the panel. The system of the present invention can maintain the percentages of Democrats and Republicans of the national averages.

Another embodiment of the present invention concerns a method of selecting people to survey including providing a list of panel members, selecting members using a random first selection and additional selections determined by a calculated interval value wherein members of the same household are placed on the list together so that the selection process using the interval makes it less likely that members of the same household are selected for the survey.

This method avoids the interference problems that can occur if two members of the same household fill out the same survey. The responses of household members tends to influence one another. The interval values are typically greater than the number of household members and thus only one member of a household is selected. Additionally, households can be grouped by household type on the list. This helps ensure that household type composition of survey members reflects that of the general population.

Another embodiment of the present invention is a method of selecting a non-proportionate sample from a panel. In this embodiment, the weights for panel members in the selection process are done so as to produce the desired skew in the type of member selected. The members are randomly selected from the survey using the selection weights. In one embodiment the weighted interval process is used. For example, if the panel has 2,000 Democrats and 1,000 Republicans and it is desired to select 200 Democrats and 300 Republicans, the weights can be determined to be 0.8 for Democrats, and 1.2 for Republicans. This allows the Republicans and Democrats to be selected randomly but in the proportions of the sample specification.

BRIEF DESCRIPTION OF THE DRAWINGS

FIG. 3 are details of a weighted interval selection process for the system of the method shown in FIG. 2.

FIG. 4 is a diagram illustrating the grouping of household members together in the interval list selection process.

DETAILED DESCRIPTION OF THE PREFERRED EMBODIMENT

Figure 1:
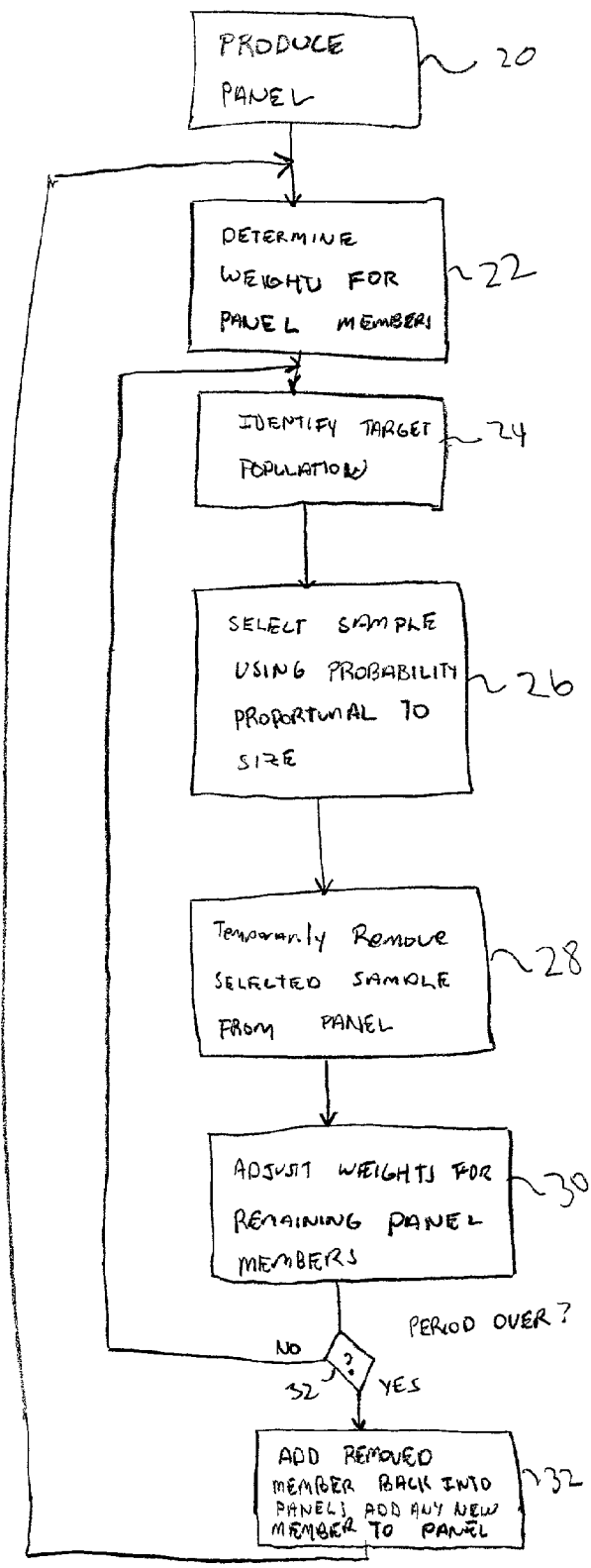
FIG. 1 is a flowchart of one method of the present invention.

FIG. 1 shows a flowchart of one method of the present invention. In step 20, a panel is produced. The panel contains people who will respond to surveys. In step 22, the weights for the panel members are selected. In this example, the weights should be derived such that the weighted frequency distributions for members on the panels roughly match the distribution in the general public. In one example, the panel is divided into a number of demographic cells, each of the cells roughly given a weight reflecting the relative cell size in the general population. For example, one cell might be urban white males, age 18-24. Additional weighting of members of the panel for characteristics may also be done. In step 24, a target population is identified. For some cases, the characteristics of the members to be selected for the survey will not match the general population. For example, if only Democrats are to be sampled, the remaining non-sampled members of the panel will be skewed towards Republicans. This is not a problem if the selected members of the panel can be randomly selected for the next survey. However, in many situations, it is desirable to assure panel members that they will only be given a survey during a predetermined period, for example, once a week or once a month. In that case, the remaining members of the panel will be skewed. The inventors have found that one way of dealing with this issue is to adjust the weights of the remaining panel members so that a selection of a group from the remaining panel members that roughly matches the demographics of the general public can be done. As described below, this selection can also be further skewed by non-proportionate selections. After the target population is determined, the sample is selected in step 26, using probabilities proportional to the weights. In step 28, the selected sample members are temporarily removed from the panel. In step 30, the weights of the remaining panel members are adjusted. One way to do this is to increase the selection weights for members of the target population which were not selected. For example, if Democrats were previously removed from the panel, the remaining non-selected Democrats are given an increased weight to compensate for the Democrats removed from the panel. Decision block 32 checks whether the period in which members are removed from the panel is over. If so, the removed members are put back in the panel in step 32, and the re-weighting is done in step 22 to match the weights of the panel members to the general population demographics. If the panel is growing, new members can be added at this point. Another way of operating is that each member of the panel is removed from the panel for a certain time period, and after this time period, they're put back into the panel. If the period is not over, steps 24, 26, 28 and 30 are repeated for additional surveys. A relatively large number of survey samples can be produced from a single panel with the selection probabilities not being skewed by the removal of panel members from the panel.

Figure 2:
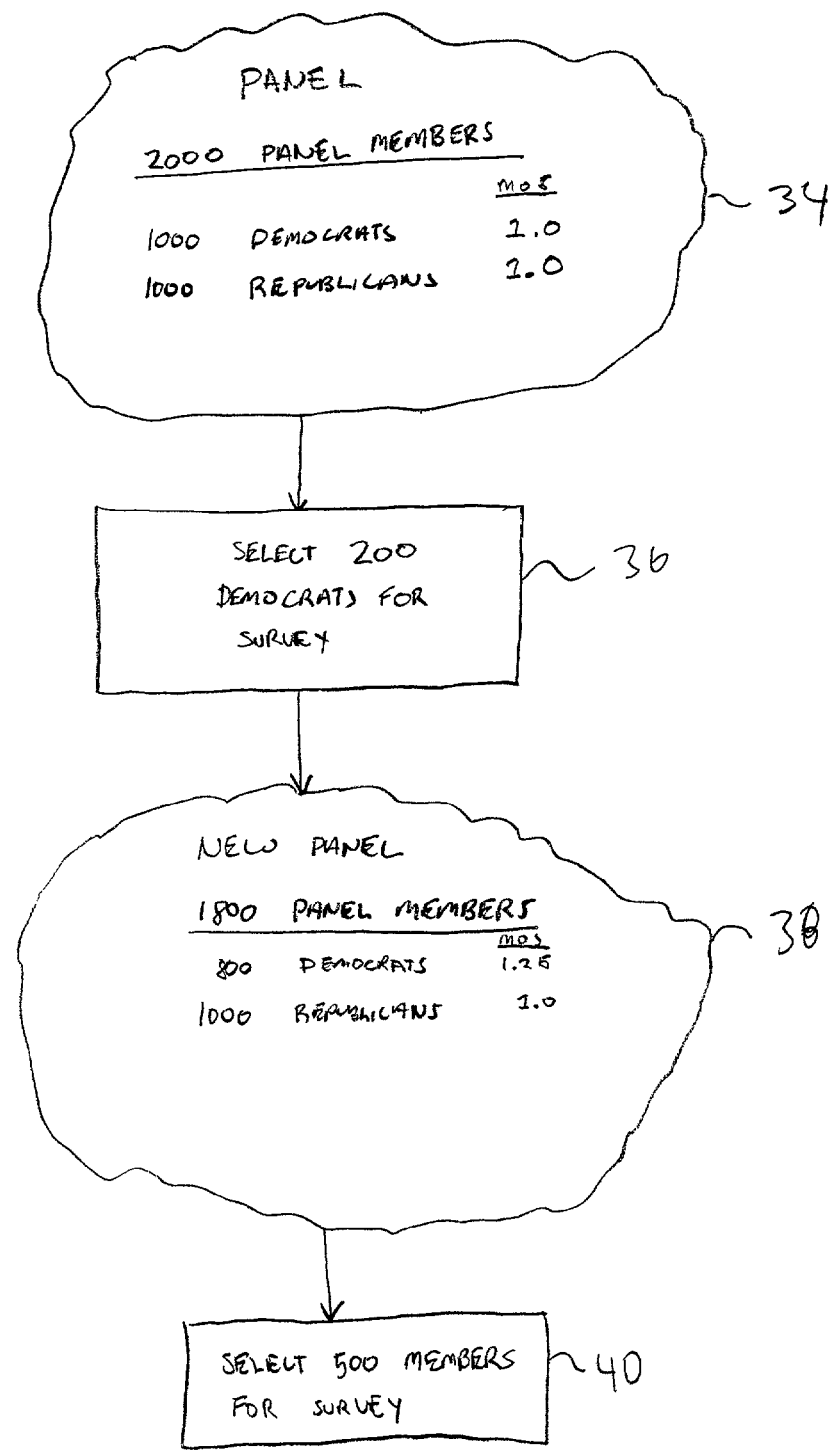
FIG. 2 is a diagram illustrating the example of the method illustrated in FIG. 1.

FIG. 2 is a diagram that illustrates an example of the method of FIG. 1. In block 34, a panel is shown with 2,000 panel members, 1,000 Democrats and 1,000 Republicans, each member given a measure of size of 1.0. The measure of size (MOS), or weight affects the selection probabilities. In the step 36, 200 Democrats are selected for the survey. The composition of the new panel 38 is 800 Democrats and 1,000 Republicans. The panel is skewed towards Republicans due to the removal of 200 Democrats in step 36. In this case, the measure of size or weight of each of the remaining 800 Democrats is increased to 1.25. The selected Democrats can be given a weight of 0, which effectively removes them from the panel. In Step 40, if 500 members of the remaining panel are selected, since the Democrats are given a higher weight, it's likely that the composition of the 500 member selected panel will have roughly the same number of Democrats and Republicans as indicated by the original panel shown in 34. The weights for the remaining Democrats can be calculated by dividing the number of original members of the group, in this case 1,000, by the number of remaining members of the group, in this case, 800. This produces the weighting factor of 1.25. Note that the selection in step 36 can be an even more complex one compensating for multiple characteristics. For each group characteristic that was selected for in a non-proportionate manner, the original member number or percentage is divided by the current member number or percentage. Note that the weights described here can be combined or multiplied with the original demographic weights of the panel and with the current non-proportionate selection weights as described below with respect to FIG. 6. The non-proportionate selection of members can also use temporary weights which can be further combined with the weights shown here.

FIG. 3 is a diagram that illustrates a weighted interval selection process, often called "systematic sampling", for the first 10 panel members of the panel of FIG. 2. In block 50, which corresponds to panel 34 and step 36 of FIG. 2, 200 Democrats are to be selected from the panel. Since no Republicans are selected, the weights of the Republicans are temporarily reduced to 0. An interval value K' is calculated. K' is equal to the summation of the measure of size for the entire panel divided by the number of panel members and which are to be selected. In this case, the total measure of size is 1,000, one for each of each 1,000 Democrats and the number selected is equal to 200. In this case, the interval is equal to 5. Thus, the random number between 0 and 5 is selected. In this case, the number 3 is selected. Thus, the first selection is done at a cumulative MOS value of 3. The second value is selected at a cumulative MOS value 3 plus the interval equal to 8, and so on with increasing interval values. In this case, the panel member number 5 has a cumulative MOS value of 3 and thus is selected for the panel. In the step 52, the panel member number 5 is removed from the available panel and his or her MOS value is reduced to 0. Steps 52 corresponds to the panel composition of 38, which the MOS values of the Democrats is increased, due to the removal of the 200 Democrats from the panel. In this case, the MOS value of the remaining Democrats is increased to 1.25 and the MOS value of the Republicans remain at 1. Note that the 1.25 factor effectively compensates for the removal of some of the Democrats, such as panel member number 5. The interval value for this step is calculated as the summation of all the MOS values, in this case, 2,000, over the selected members of the sample and, in this case 500, producing an interval of 4. The random number between 0 and 4 is selected to be 1. This gives a first selection at a cumulative MOS of 1, a second selection at a cumulative MOS of 1 plus the interval 4, or 5, and a third selection at a cumulative MOS of 1 plus 2 times the interval, or 9. Thus, in this case, panel member 1 with the cumulative MOS of 1.25 is selected, panel member 6, with a cumulative MOS of 5.5 is selected, and panel member 9, with a cumulative MOS of 9 is selected. Note that other random selection methods other than the weighted interval method could also be used with a weighted system of the present invention.

FIG. 4 illustrates another embodiment of the present invention. In the weighted interval selection, it's desired to have only one member of the household selected if possible. A simple way of doing this is to use weighted interval selection with each member of a household grouped together in the list. As long as the selected interval is greater than the largest household, only one member is selected for each household. The same surveys sent to two individuals in a single household could result in contamination. Another method done in one embodiment of the system of present invention is to group the households into household groupings or strata having different demographics. By separating the different household groupings, the sample will more closely resemble the population distributions.

Figures 5, 6:
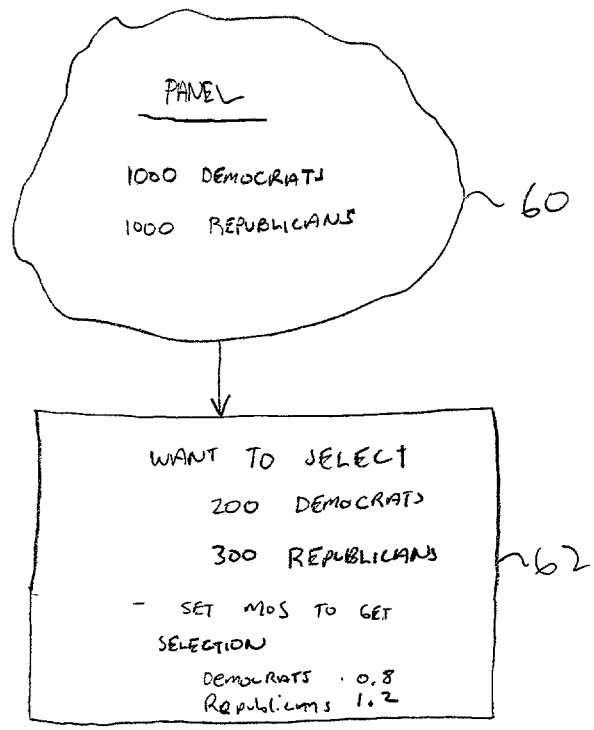
FIG. 5 is an illustration of the method of the present invention in which a non-proportionate sample is selected.
FIG. 6 is an illustration of different weights used with the system of the present invention.

FIG. 5 illustrates a way of using weights to obtain a non-proportionate or stratified sample. In the example of FIG. 5, the panel starts with 1,000 Democrats and 1,000 Republicans in block 60. Block 62, roughly 200 Democrats and 300 Republicans are desired for a survey. This is an example of a non-proportionate selection of sample members. In this method, the weights can be modified by a factor to select the percentages desired. In this case, the weights of the Republicans is increased, compared to the weights of the Democrats. In one example, the weights of each member of a group are modified by the proportion of the sample in each group or stratum. In this example, the ratio is 0.4 for the Democrats, and 0.6 for the Republicans. These numbers need to be adjusted so that the sum of the weight remains unchanged. This can be achieved, in this example, by multiplying by 2 giving Democrats weights of 0.8 and Republicans weights of 1.2.

Note that the weights calculated here can be multiplied by panel weights calculated earlier. In fact, the system in general preferably builds on the most recent version of the panel weights. The weights for each panel build on the weights added for previous panels until the time period is over.

Note that, as shown in FIG. 6, the weights calculated here can be multiplied by the panel weights calculated earlier. When 200 Democrats and 300 Republicans are selected from a panel of 1800 panel members 800 being Democrats with a current MOS of 1.25 and 1,000 being Republicans with a current MOS of 1.0), the Democrats' MOS becomes 0.8×1.25 or 1, the Republicans' MOS becomes 1.20×1 or 1.2.

The non-proportionate selection weights are only temporary, and are removed after the non-proportionate selection process. In one example, each panel member could have an original weight selected at the beginning of the period, the original weight making the panel selection distributions match the demographics of the general public. A modified weight to compensate for the members removed from the panel as described with respect to FIGS. 1-3, as well as a non-proportionate selection of weight factors. The three weight factors can be combined so as to produce the desired selection. This is shown in FIG. 6. In this example, an original weighting factor, $W_o$, illustrates the demographics weights done at the beginning of the period. The removal weight factor, $W_r$, is a weighting factor that deals with the removal of members from the panel. This can be calculated as described above, in which case the original number of members is divided by the remaining number of members in order to get a weight factor dealing with the change in composition. Additionally, the sampling weights is also given a sampling or non-proportionate weight term, $W_{np}$. In this example, the sampling weights are provided to produce 200 Democrats and 300 Republicans. If no Republicans have been selected, the sampling weight of the Republicans is reduced to zero.

In a preferred embodiment, the methods of the present invention are implemented using a processor. For example, a software program implementing the present invention can be run on a general-purpose computer.

It will be appreciated by those of ordinary skill in the art that the invention can be implemented in other specific forms without departing from the spirit or character thereof. The presently disclosed embodiments are therefore considered in all respects to be illustrative and not restrictive. The scope of the invention is illustrated by the appended claims rather than the foregoing description, and all changes that come within the meaning and range of equivalents thereof are intended to be embraced herein.

The invention claimed is:

1. A computer-implemented method comprising:
    identifying a group within an available survey panel including a plurality of members, the group having predetermined characteristics;
    determining a weight for each of the members, said weight being derived to match the members to demographics of the general public;
    selecting a first set of members from the group for a first survey;
    temporarily removing the selected first set of members from the available survey panel;
    adjusting weights of remaining members of the available survey panel to compensate for the removal of the first set of members from the available survey panel and thereby to make the remaining members of the available survey panel match the demographics; and
    selecting, with a processor, additional members from the available survey panel for a second survey, selection probabilities of the additional members being respectively proportional to the adjusted weights to compensate for the removal of the first set of members from the available survey panel;
    wherein the step of selecting, with a processor, additional members includes:
        determining an interval value that is equal to a summation of the adjusted weights of the remaining members of the available survey panel divided by the number of the additional members to be selected;
        selecting a random number that is between zero and the interval value;
        assigning an identification (ID) number to each of the remaining members of the available survey panel;
        determining a cumulative weight for each of the remaining members of the available survey panel, the cumulative weight of each particular remaining member being determined by a summation of the weight of the particular remaining member and the weights of other remaining members whose ID numbers are smaller than the ID number of the particular remaining member; and
        choosing the additional members from the remaining members, each of the additional members having a cumulative weight that matches the sum of the random number and an integer multiple of the interval value.

2. The method of claim 1, wherein the step of adjusting weights includes increasing the selection probabilities of remaining members in the group.

3. The method of claim 1, wherein weights of the remaining members of the panel are modified to compensate for the group members removed from the panel by using a weight factor proportionate to the number of original members in the group over the number of remaining members in the group in the available panel.

4. The method of claim 1, wherein multiple groups are identified within the available survey panel, and members of these multiple groups are selected for the survey and removed from the available survey panel, and wherein selection probabilities of the multiple groups are modified to compensate for the removal of the members of the group from the available survey panel.

5. The method of claim 1, wherein the step of selecting a first set of members includes:
    determining an additional interval value that is equal to a summation of the weights of the members of the available survey panel divided by the number of the first set of members to be selected;
    selecting a an additional random number that is between zero and the additional interval value;
    assigning an additional identification (ID) number to each of the members of the available survey panel;
    determining an additional cumulative weight for each of the members of the available survey panel, the additional cumulative weight of each particular member being determined by a summation of the weight of the particular member and the weights of other members whose additional ID numbers are smaller than the additional ID number of the particular member; and
    choosing the first set of members from the available survey panel, each of the first set of members having an additional cumulative weight that matches the sum of the additional random number and an integer multiple of the additional interval value.

6. The method of claim 1, wherein one or more weighting factors are multiplied to the weights of the remaining members of the available survey panel to compensate for the removal of people who have been previously given a survey within a certain time period.

7. The method of claim 6, wherein the weighting factors include an original weighting factor to match the members of the available survey panel to the demographics of the general population, a removal weighting factor to compensate for all of the members of the panel removed from the panel and a selection weighting factor to deal with a non-proportionate selection.

* * * * *